I. F. KEPLER.
TRACTION DEVICE.
APPLICATION FILED SEPT. 15, 1921.

1,410,760.

Patented Mar. 28, 1922.

Inventor
Irwin F. Kepler
By Robert M. Pierson
Atty.

UNITED STATES PATENT OFFICE.

IRWIN F. KEPLER, OF AKRON, OHIO, ASSIGNOR TO THE B. F. GOODRICH COMPANY, OF NEW YORK, N. Y., A CORPORATION OF NEW YORK.

TRACTION DEVICE.

1,410,760.　　　　Specification of Letters Patent.　　Patented Mar. 28, 1922.

Application filed September 15, 1921. Serial No. 500,774.

*To all whom it may concern:*

Be it known that I, IRWIN F. KEPLER, a citizen of the United States, residing at Akron, in the county of Summit and State of Ohio, have invented a certain new and useful Traction Device, of which the following is a specification.

This invention relates to the supporting and ground-gripping structure of power tractors and its principal object is to provide an improved cushioning device which will enable the tractor to travel over ordinary roads without injuring the surface and will also enable it to obtain a firm grip in soft ground.

Figure 1:
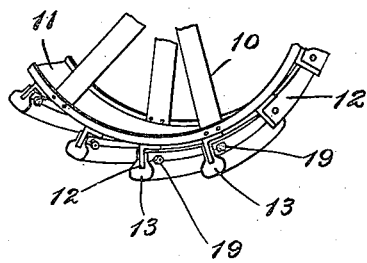
Fig. 1 is a perspective view showing a portion of a tractor wheel provided with my improved tread members.
Figure 2:
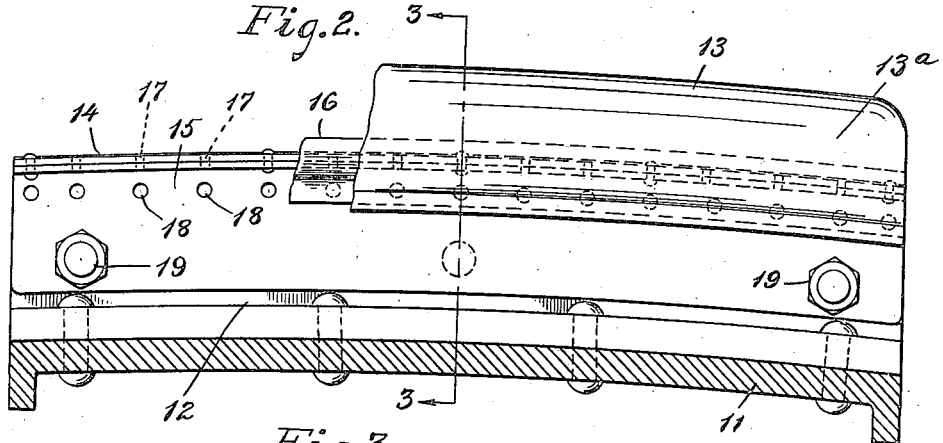
Fig. 2 is a diagonal, transverse section through the rim of the wheel showing one of the cleats in elevation with the tread device thereon partly broken away.

I have shown an ordinary tractor wheel 10, provided with the usual rigid rim 11 to which are riveted the bases of the usual L-shaped, transverse, radially projecting, diagonally disposed metal cleats 12, these cleats being spaced far enough apart so that the wheel rim 11 furnishes some of the support in soft ground.

On the cleats 12 I mount my improved cushioning devices, each of which comprises a rib-like tread member or tire segment 13 including a soft-rubber body 13ª molded around an embedded metal reinforcing plate 14 to which are riveted the flanged upper edges of a pair of parallel metal attaching plates 15 also partially embedded in the tread rubber and together constituting a bifurcated base. The plates 14 and 15 form a base structure substantally T-shaped in cross section which straddles the cleat 12 and rests upon its outer or gripping edge. The embedded portions of the plates are surrounded by hard rubber 16 connecting them with the soft rubber and are preferably formed with perforations 17, 18 for interlocking with the hard rubber, the rubber portions being vulcanized in place on the metal plates in a suitable mold. The cleat 12 and plates 15 are provided with alined perforations for receiving a series of attaching bolts 19, here shown as two in number, for securing said plates and cleat together, the bolts having sufficient play in the holes to avoid bringing the supporting strain directly upon them.

It is found that the reinforced rubber tread members 13 provide an effective cushioning structure for the tractor wheel, enabling it to travel rapidly and without damage over ordinary roads and they do not interfere with, but rather improve, the tractive qualities of the wheel in soft ground since they deepen the radial projections on the wheel. The longitudinal or circumferential width of the spaces between the rubber tread members 13 is greater than the width of said members so that in very soft ground the wheel rim 11 will have ground contact and furnish supporting surface between the cushioned cleats.

Figures 3, 4, 5:
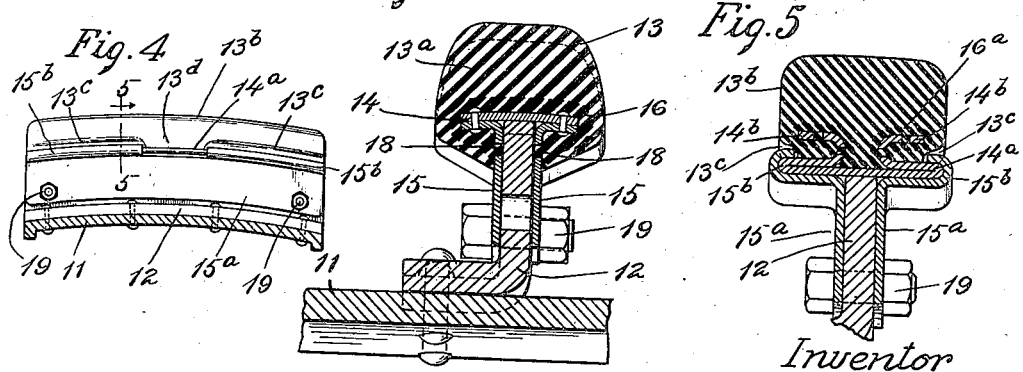
Fig. 3 is a section on the line 3—3 of Fig. 2.
Fig. 4 is a transverse section of a tractor wheel equipped with a modified form of my invention.
Fig. 5 is a section of this modification on the line 5—5 of Fig. 4.

The above-described structure may be variously modified without departing from my invention. For example, in Figs. 4 and 5 a cushioning or soft-rubber body member 13ᵇ having permanently vulcanized thereon a metal base member 14ª provided with perforated flanges 14ᵇ surrounded by hard rubber 16ª and embedded in the soft-rubber body is made separate from the attaching metal side-plate members 15ª of the base, which are bolted to the cleat 12 and formed with hooked flanges 15ᵇ engaging the edges of the base member 14ª so that the cushion may be renewed when desired without changing the side-plate members. The sides of the cushion member 13ᵇ are grooved at 13ᶜ adjacent to the projecting edges of the metal base member to receive the inturned edges of the side-plate flanges 15ᵇ and are made flush at 13ᵈ between the two flanged portions of each side plate to interlock the cushion member with the side plates against relative movement longitudinally of the cleat.

I claim:

1. A traction device comprising a traveling tractor-supporting structure having a series of transverse cleats, and a series of soft-rubber tread members having bifurcated metal bases straddling and detachably secured to said cleats.

2. A tractor wheel having on its periphery a series of transverse, radially-projecting cleats, and a series of soft-rubber tread members overlying said cleats and provided with bifurcated metal bases straddling the cleats.

3. A tractor wheel having on its periphery a series of transverse, radially-projecting cleats, a series of soft-rubber tread members provided with bifurcated metal bases straddling the cleats, and bolts traversing said bases and cleats for detachably securing them together.

4. A tractor wheel having on its periphery a series of transverse, radially-projecting cleats, a series of soft-rubber tread members each having embedded therein a metal reinforcing plate which rests on the outer edge of one of the cleats, and a pair of metal base plates connected with said reinforcing plate and embracing the cleat between them.

5. A tread attachment for tractors comprising a soft-rubber tread member having a bifurcated metal base permanently secured thereto.

6. A tread attachment for tractors comprising a soft-rubber segment having an embedded metal reinforcing structure, and a bifurcated metal attaching structure connected therewith.

7. A tread attachment for tractors comprising a soft-rubber tread segment, a metal reinforcing plate embedded therein and surrounded by hard rubber connecting said plate with the soft rubber, and bifurcated attaching means permanently secured to said plate and forming therewith a structure substantially T-shaped in section.

In witness whereof I have hereunto set my hand this 9th day of September, 1921.

IRWIN F. KEPLER.